United States Patent [19]
Schust et al.

[11] Patent Number: 5,729,930
[45] Date of Patent: Mar. 24, 1998

[54] ADJUSTABLE ASSEMBLY FOR CONNECTING A WINDOW REGULATOR TO A MOVABLE WINDOW

[75] Inventors: Gerhard Schust, Weidhausen; Erik Langmann, Coburg, both of Germany

[73] Assignee: Brose Fahrzeugteile GmbH & Co. KG, Coburg, Germany

[21] Appl. No.: 542,100

[22] Filed: Oct. 12, 1995

[30] Foreign Application Priority Data

Oct. 20, 1994 [DE] Germany .................. 44 37 532.8

[51] Int. Cl.$^6$ .................................................. E05F 11/38
[52] U.S. Cl. ........................................... 49/375; 49/372
[58] Field of Search .......................... 49/372, 374, 375; 52/208

[56] References Cited

U.S. PATENT DOCUMENTS

| | | | |
|---|---|---|---|
| 3,383,800 | 5/1968 | Sturtevant | 49/374 |
| 4,442,633 | 4/1984 | Gianotti | 49/375 |
| 4,628,637 | 12/1986 | Okada et al. | 49/374 |
| 4,762,904 | 8/1988 | Nakama | 49/358 |
| 4,866,895 | 9/1989 | Hlavaty | 52/208 |
| 5,341,599 | 8/1994 | Cox | 49/375 |
| 5,363,595 | 11/1994 | Wirsing | 49/375 |
| 5,502,926 | 4/1996 | Grace et al. | 49/375 |
| 5,515,651 | 5/1996 | Hofmann et al. | 49/375 |

FOREIGN PATENT DOCUMENTS

| | | |
|---|---|---|
| 070815 | 10/1986 | European Pat. Off. . |
| 189753 | 12/1988 | European Pat. Off. . |
| 528705 | 1/1977 | Germany . |
| 2843633 | 4/1980 | Germany .................. 49/375 |
| 535719 | 9/1986 | Germany . |
| 239601 | 11/1992 | Germany . |

Primary Examiner—Kenneth J. Dorner
Assistant Examiner—Curtis Cohen
Attorney, Agent, or Firm—Christie, Parker & Hale, LLP

[57] ABSTRACT

An arrangement for connecting a window regulator to a movable window of a motor vehicle, using a hole in the window, in which an external expandable or spreadable insertion part rests, whose length corresponds essentially to the thickness of the window, and an internal insertion part connected with a basic part. The internal part can act on the external insertion part by expanding or spreading, whereby a tension- and/or form-fitting engagement with the contour of the hole in the window is produced, and is characterized in that the external insertion part has a slot-shaped opening, in which the internal insertion part rests movably in the assembly position at least until the internal insertion part is braced with the external insertion part.

18 Claims, 4 Drawing Sheets

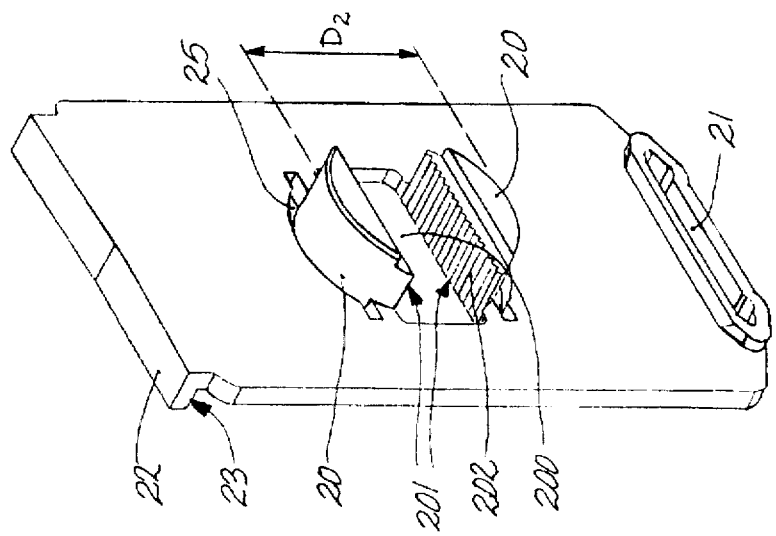
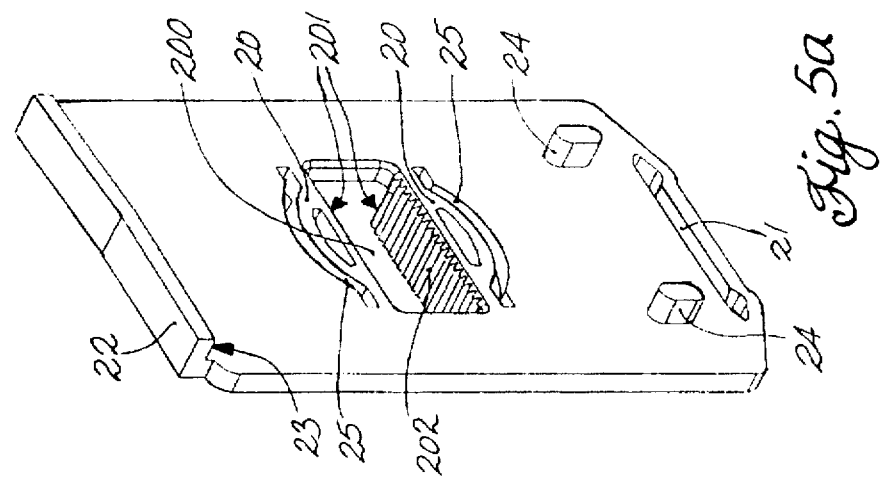
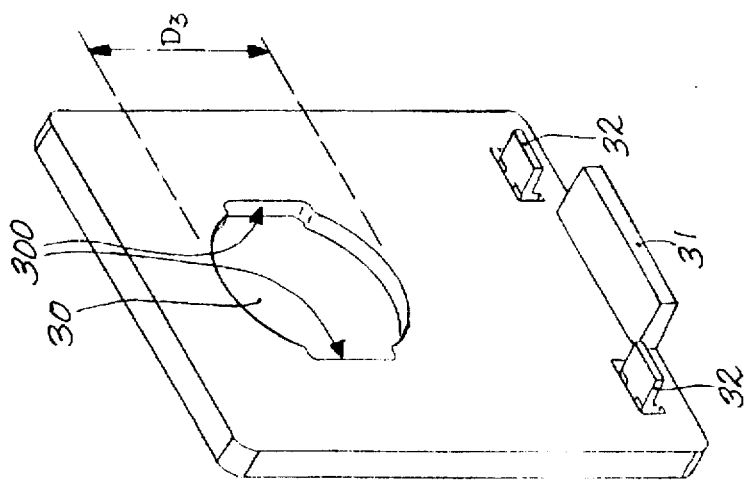

ADJUSTABLE ASSEMBLY FOR CONNECTING A WINDOW REGULATOR TO A MOVABLE WINDOW

BACKGROUND OF THE INVENTION

This invention relates to window mounting apparatus.

It has long been customary to utilize windows in motor vehicles in conjunction with a mechanism for raising and lowering the window. However, difficulty is frequently encountered during installation of movable windows, so attempts have been made to simplify the installation process.

From EP-B1 0 070 815, a carrier element is known which is designed as a one-piece plastic body and is guided on spread arms of a sliding support of a cable window regulator. Its pin-like projection associated with a hole in the window has flexibly deformable tongues which surround an axially oriented channel. This channel serves to accommodate a screw during whose tightening the flexible tongues are pressed against the wall of the hole in the window, whereby the projections formed on the free ends of the tongues grip the edge of the hole in the window from behind.

DE-C2 25 28 705 describes a releasable screw connection including a hole in the window of a motor vehicle. It uses a plug-shaped conical part engaging in the hole with said part being made of an elastic material and being compressible between a screw head and a nut. Upon tightening of the screw coupling, the plug forms a rim on its free end. The rim braces the window on the connecting arrangement.

A fastening arrangement to attach the bolt of a window regulator carrier within a hole in the window with bore tolerances is described in DE-C1 35 35 719. This is supposed to ensure simple fastening with precisely proportioned fastening force. This is accomplished by using an expandable elastic ring element with spiral-shaped inner faces inserted through the hole. The inner faces can be braced against associated external faces of a bayonet union.

All the above-described solutions have the disadvantage that they permit no variable positioning between the position of the hole in the window and the assembly for connection to the window. Consequently, means which ensure compensation of the tolerances present in the system must be provided elsewhere for adjustment of the window.

BRIEF SUMMARY OF THE INVENTION

There is, therefore, provided in an embodiment of the invention a novel assembly for adjustably connecting a window regulator to a window. The assembly has an expandable external insertion part which extends into a hole in the window and defines a slot-shaped opening therein. An internal insertion part is slidably inserted into the slot-shaped opening, allowing the relative positions of the internal insertion part and the external insertion part to be adjusted.

In a preferred embodiment of the invention, the internal insertion part is expanded by inserting a fastener into a channel in the internal insertion part. The expansion of the internal insertion part causes the expansion of the external insertion part which then engages the hole of the window and fixes the relative positions of the different parts of the assembly. The external insertion part has two inwardly facing surfaces which are engaged by two outwardly facing surfaces on the internal insertion part. Both surfaces of the internal insertion part have toothed elements, while one surface of the external insertion part has toothed elements, and the other surface of the external insertion part is smooth. The smooth portion of the external insertion part allows the assembly to be adjusted, and the toothed surface of the external insertion part engages one of the toothed surfaces of the internal insertion part to fix the assembly after the fastener is installed into the internal insertion part. Thus, it is possible to transfer the assembly from the driver's side of a vehicle to the passenger side of a vehicle utilizing the same parts by rotating the assembly 180° and inverting the mounting plate. Further, the assembly has means for prevention of torsion between the base plate and the mounting plate comprising bent flanges at the edge of the mounting plate which engage the edge of the base plate. Protrusions extending from the mounting plate into recesses on the base plate also prevent torsion between the base plate and the mounting plate. Still further, the preferred embodiment includes a relief slot associated with the external insertion part to allow the internal insertion part to flex radially.

Advantages of this invention will appear from the following description of the preferred embodiments and the accompanying drawings in which similar reference characters denote similar elements throughout the several views.

BRIEF DESCRIPTION OF THE DRAWINGS

FIG. 4 is a perspective view of the cover plate;

FIG. 5a is a perspective view of the mounting plate; and

FIG. 5b is a perspective view of the mounting plate of FIG. 5a rotated 180°.

DETAILED DESCRIPTION

Figure 1A:
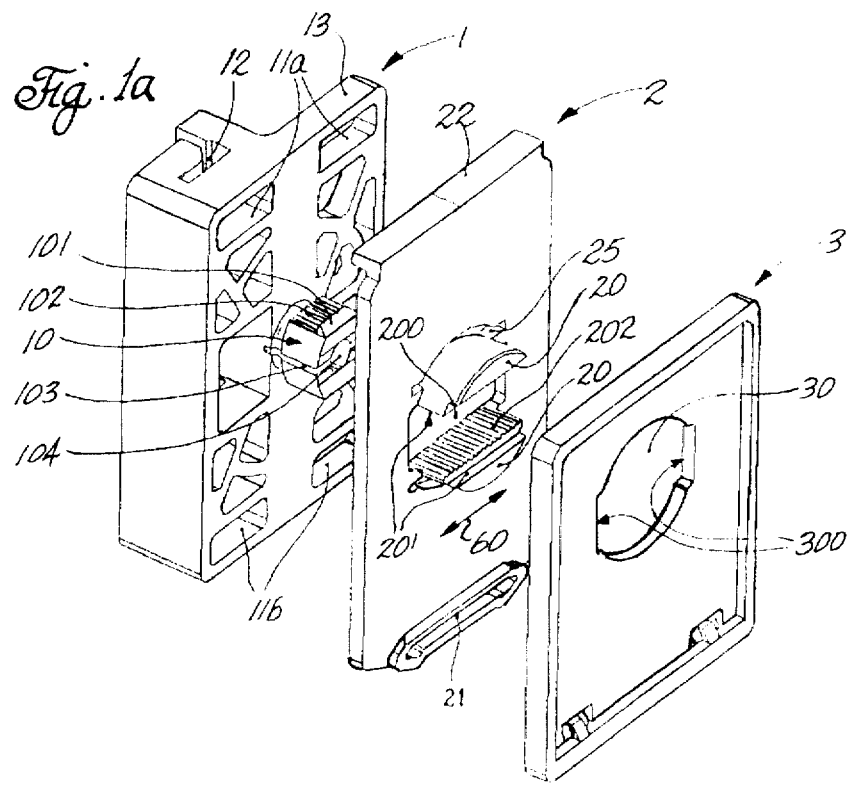
FIG. 1a is a perspective exploded view of the connecting arrangement according to the invention.
Figure 1B:
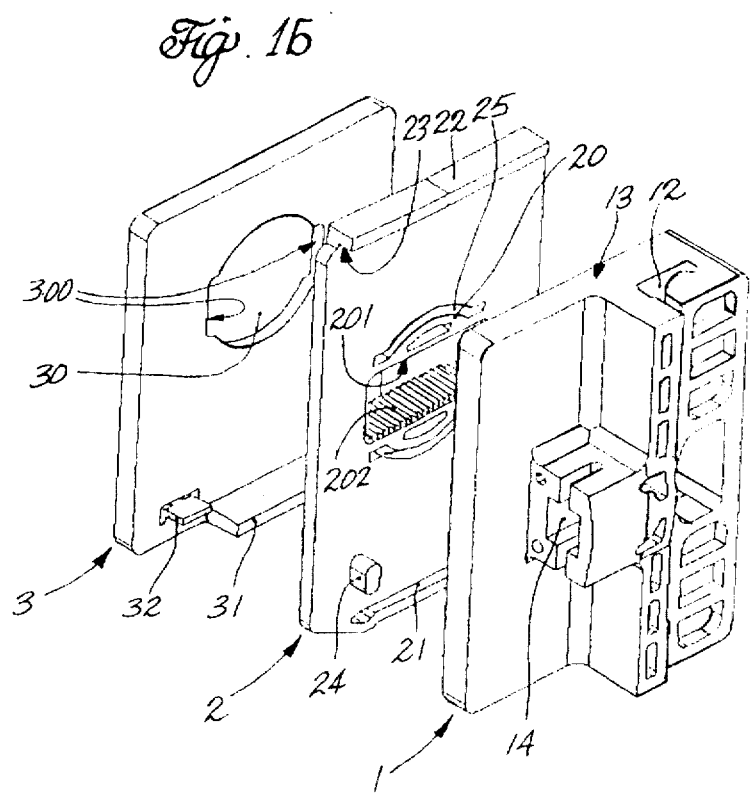
FIG. 1b is a view of the connecting arrangement of FIG. 1a rotated 180°.

Turning to the drawings, the perspective exploded views of FIGS. 1a and 1b depict an embodiment of the invention having a three-part connecting arrangement according to the invention, which is provided to connect a cable window regulator with the window of a motor vehicle. It comprises a base plate 1, a mounting plate 2, and a cover plate 3.

By means of the bent guide slot 12 of the base plate 1, this part is in sliding connection with the guide rails (not shown) of a cable window regulator which engages form-fittingly with an adaptable region in the slot 12. Customarily, a power-driven cable loop with a cable nipple attached to it, which nipple rests in a nipple chamber 14, is provided to transfer the adjusting forces between the regulator and the window.

Figure 3:
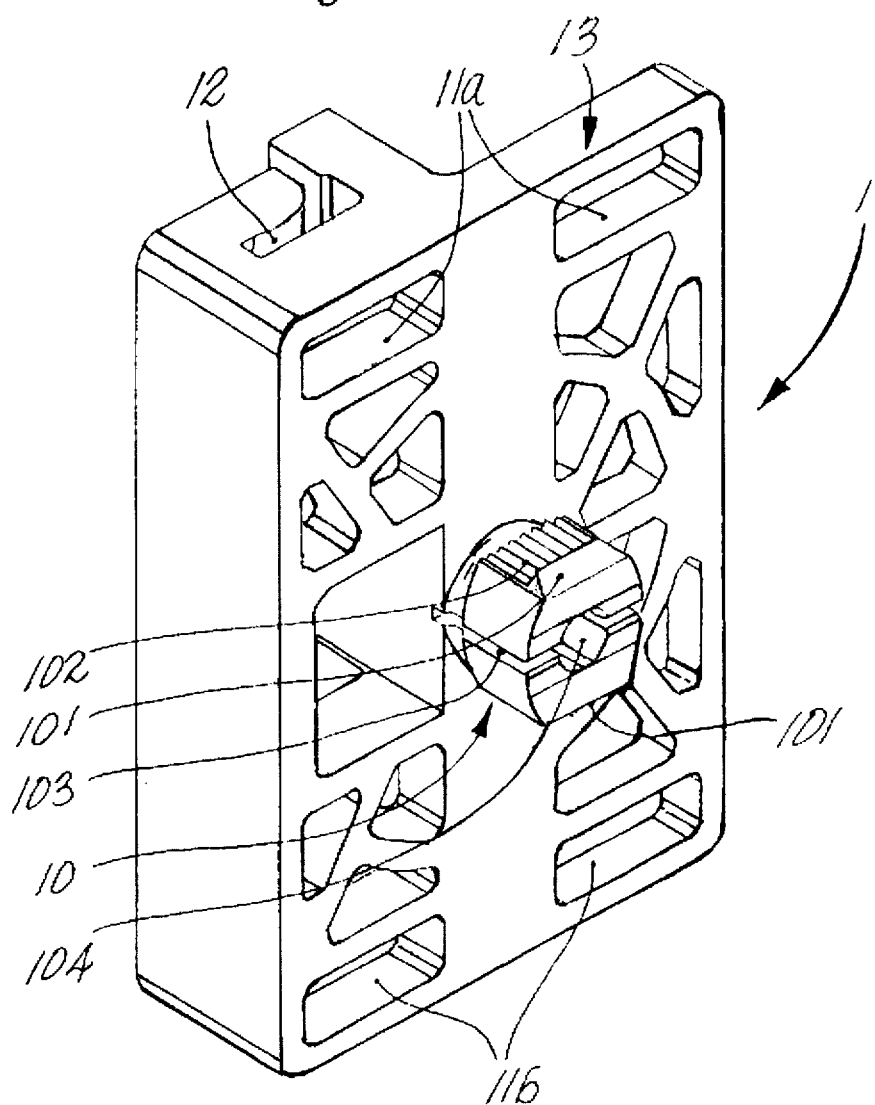
FIG. 3 is an enlarged perspective view of the base plate.

The side of the base plate 1 opposite the nipple chamber has an internal insertion part 10 which is horizontally split by a slot 103 and is spreadable with the introduction of a suitable screw, fastener, or the like into the axially running channel 104 (see also FIG. 3). The top and the bottom regions of the internal insertion part 10 have toothed elements 102 which, in each case, form outward faces running horizontally parallel to each other, whereby the toothed elements 102 are oriented perpendicular to the direction of movement illustrated by arrow 60 of the internal insertion part 10 within the slot-shaped opening 200 of mounting plate 2, likewise running horizontally. In addition, the base plate 1 has recesses 11a, 11b into which projections 24 of the mounting plate are slidably inserted. Thus, the adjustment of the mounting plate relative to the window hole is not impeded.

Figure 2:
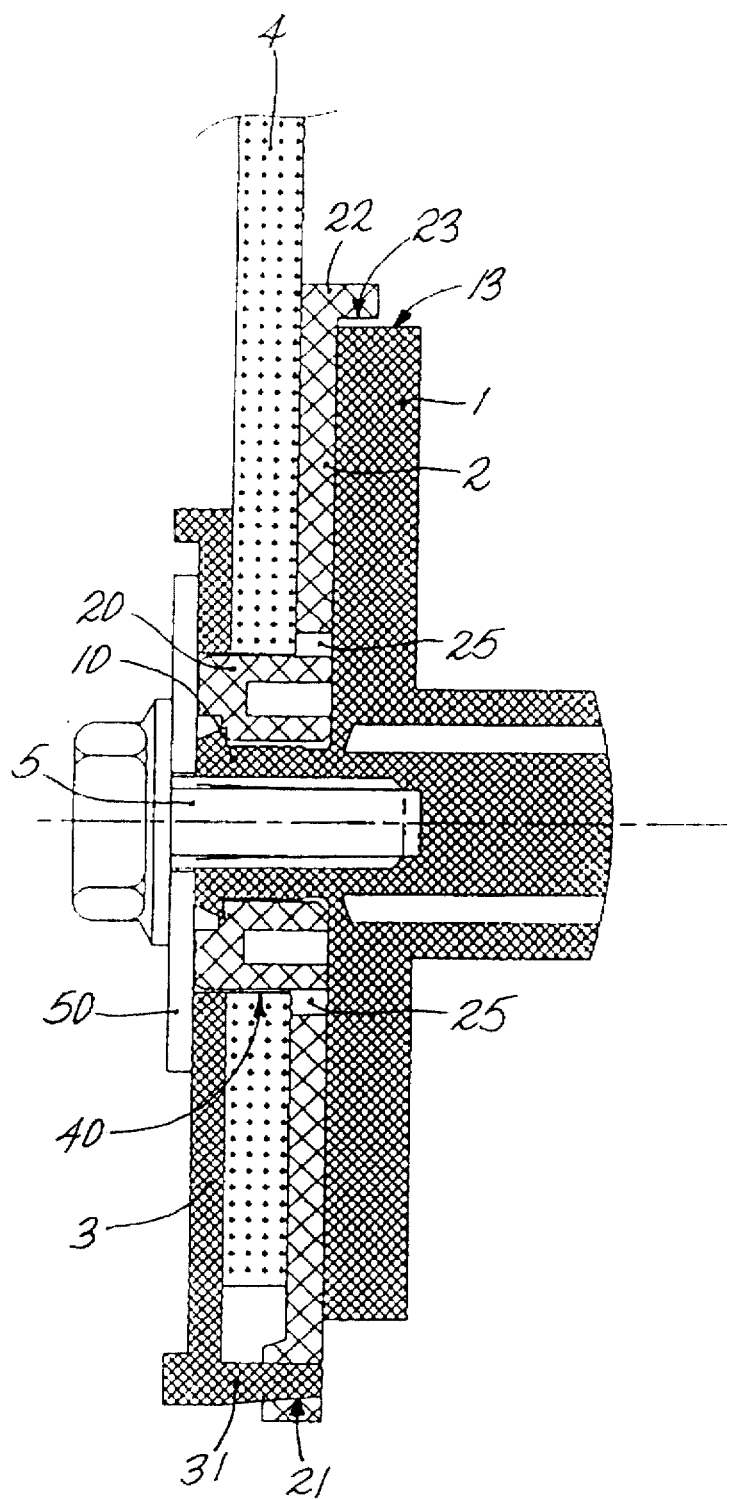
FIG. 2 is a transverse section through the fastening arrangement with the fastening screw tightened.

The external insertion part 20 of the mounting plate 2 (see FIGS. 5a and 5b for individual depiction) associated with a hole in the window 40 (see FIG. 2) has essentially the shape of two opposing sections of a cylinder, whose flat cut inward faces 201 delimit the slot 200 on two sides. Of the faces 201, only the bottom face has toothed elements 202 which have the same orientation as the toothed elements 102 of the internal insertion part 10. The top surface 201 is smooth, such that under the weight of the window, problem-free movement of the internal insertion part 10 within the slot 200 remains possible until a spreading of the internal insertion part occurs. Thus, the mounting plate 2 can be moved relative to the hole in the window, or the window can be moved relative to the mounting plate, to a position inside guide slot 12 properly aligned to receive, for example, the guide rails of a window regulator.

With their arched contour, the two cylindrical sectional regions of the external insertion part 20 supported by the mounting plate 2 define a relief slot 25 associated with the external insertion part 20, which permits uniform radial spreading of the two regions. The diameter $D_2$ of the external insertion part 20 corresponds preferably to the lower tolerance limit of the hole 40 in the window 4. In the top region, the mounting plate 2 terminates in a flange 22, whose bottom stop face 23 is associated with the stop face 13 of the base plate 1 and prevents an undesirable torsion of the base plate 1 and the mounting plate 2 relative to each other. For this purpose, it is alternatively possible to provide projections 24 on the mounting plate 2, which engage in recesses 11a, 11b, or both, of the base plate in the assembly position. Depending on whether the base plate 1 is used in the driver door or the passenger door and is thus used in the position depicted or in a position rotated by 180°, the projections 24 engage either in the bottom recesses 11b or in the top recesses 11a. The same is true for the engagement of the stop face 23 of the mounting plate 2 on the top or bottom stop face 13 of the base plate 1.

In the bottom region, the mounting plate 2 has a slot 21 for slidably receiving a flange 31 of a cover plate 3 which is disposed on the other side of the window 4. With the opening 30, whose diameter preferably corresponds to the maximum tolerance limit of the hole 40 in the window, the region of the external insertion part 20 protruding beyond the plane of the window 4 is circumferentially engaged. The distance between the lateral limiting faces 300 corresponds to the width of the slot 200 in the mounting plate 2. In a plane above the flange 31, two stops 32 are formed near the bottom of the cover plate 3, which are to engage the bottom edge of the window during the assembly process. The cover plate, mounting plate, and window can be preassembled by placing the window edge against the stops 32 and then mating the window and cover to the mounting plate.

In the assembly of the window on the window regulator, basically two different procedures may be performed. For one, the mounting plate 2 and the cover plate 3 may be premounted on the window 4 and connected with the window regulator after the introduction of the window 4 into the door channel by insertion of the internal insertion part 10 into the slot 200 of the external insertion part 20. For this, first the external insertion part 20 is introduced into the hole 40 in the window, whereby the slot 21 for connection with the cover plate 3 is positioned near the bottom edge of the window 4. Then, the cover plate 3 is slipped onto the mounting plate 2 by means of flange 31 from the other side of the window.

There also exists the possibility of completing the insertion connection formed by the flange 31 and the slot 21 with a thin film hinge (not shown) integral to both the base plate and mounting plate so that there is a one-piece component, thus reducing the outlay for logistics and handling. The base plate and mounting plate are pulled apart to insert the window in between the two plates. The hinge is thin enough to flex and allow the plates to separate far enough to receive the window therebetween.

Then, the internal insertion part 10 of the base plate 1 connected with the window regulator is inserted into the slot 200 of the mounting plate 2 premounted on the window 4. A bevel (angled surface 101) on the free end of the internal insertion part 10 facilitates insertion into the slot 200. The beveled surface 101 also facilitates the connection between the internal insertion part 10 and the external insertion part 20. The beveled surface 101 is raised above the surface of the toothed elements 202, so that when the insertion part 10 is inserted into the slot 200, the insertion part 10 clips into place. The ledge created by the raised beveled surface engages the external insertion part 20 to hold the internal insertion part 10 in place.

Now the adjustment of the window 4 may take place by pushing up slightly on the window so that the teeth 102, 202 of the insertion parts disengage, and the upper smooth surfaces of the insertion parts engage to slide past each other. With the embodiment depicted, tolerance-compensating movements are possible in the horizontal plane because the slot 200 is oriented horizontally. Since the top face 201 of the external insertion part 20 has no toothed elements, the adjustment can be carried out effortlessly in spite of the weight of the window supported on the internal insertion part 10. As soon as the window regulator and the window have assumed their ideal position relative to each other, a screw 5 is tightened into the axial channel 104 of the internal insertion part 10, whereby the insertion parts 10, 20 are spread, and the bottom toothed elements 102 of the internal insertion part 10 engage form-fittingly with the toothed elements 202 of the external insertion part 20. Thus, the relative position between the window regulator and window 4 is determined and fixed.

To ensure a reliable hold of the connection, a screw head with a diameter greater than the diameter of the hole 40 in the window should be selected. Otherwise, a washer 50 which meets the appropriate requirements is used.

In the other assembly procedure, after the window 4 is installed by disposing the hole 40 in the window on the external insertion part 20 and the cover plate 3 is positioned, the mounting plate 2 is connected with the base plate 1 first by mounting it on the internal insertion part 10. Adjustment and locking take place as already described above. This embodiment of the assembly process has the advantage that the window 4 can be installed without parts mounted on it. Thus, it is more simply installed into the narrow slot of the door channel.

The above design principles enable simplified assembly of the window regulator on the window since the sometimes significant distance tolerances can be compensated without problems between two holes in the window. The slot-shaped openings 11a, 11b, 21, and 200 of the external insertion part which are dimensioned as a function of the maximum occurring tolerances always ensure the adaptability of the connection arrangement without adjustments which are complicated or which challenge the skill of the worker. At the same time, the slot-shaped openings 11a, 11b, 21, and 200 in which the internal insertion parts 10, 24, and 31 are inserted and rest movably, for example, with a slider of a cable window regulator, are used to adjust the window. This is accomplished by spreading the parts of the internal insertion part against the external insertion part, by means of which the teeth running perpendicular to the direction of movement 60 engage each other, and thus, they define the relative position of the hole in the window to the fastening part of the window regulator (e.g., the slider of a cable window regulator). Screws are particularly suited for spreading the internal insertion part, but threadless bolts which may be clipped in are also suitable.

The invention is particularly suitable for use on window regulators which provide two fastening points for windows as is the case with crossed arm window regulators and two-strand cable window regulators. Based on the requirements of the individual case, the orientation of the slot-shaped openings in which the internal insertion parts rest movably can be unidirectional or otherwise. For example, one slot may be oriented horizontally and the other diagonally, at a certain angle in order to be able to obtain compensating effects in the vertical direction, as well.

With the use of unidirectional slots in conjunction with a two-strand cable window regulator, provision may also be made to make one fastening point (i.e., one internal insertion piece in the external insertion piece) stationary and to leave the other fastening point movable for compensation of tolerances which occur during the raising of the window.

To facilitate the handling of the arrangement according to the invention, one preferred embodiment of the invention provides a mounting plate with means for preventing torsion between the base plate and inserting plate, which also supports the external insertion part. Such torsion-preventing means are the bent flanges 22 and/or the projections 24 on the mounting plate and engage with associated stop faces 23 and recesses 11a, 11b of the base plate.

To ensure a defined stop on the side of the window opposite the base plate, provision is further made to use a cover plate with an opening whose diameter corresponds to the upper tolerance limit of the hole in the window. When assembled, this opening circumferentially engages the region of the external insertion part extending beyond the edge of the hole in the window. It is preferable in this embodiment that the mounting plate and the cover plate are fabricated from plastic, designed in one piece, and joined by means of a so-called film hinge. All parts are preferably made of plastic.

Thus, an arrangement for connecting a window regulator with a movable window is disclosed which utilizes slot-shaped openings in which insertion parts are slidably inserted, thereby allowing a wide range of adjustment during installation of the window. While embodiments and applications of this invention have been shown and described, it would be apparent to those skilled in the art that many more modifications are possible without departing form the inventive concepts herein. For example, the application of the invention is not restricted to cable window regulators. Arm window regulators may also be equipped with the connecting arrangement according to the invention. It is, therefore, to be understood that within the scope of the appended claims, this invention may be practiced otherwise than as specifically described.

The disclosure of attached German patent Application P44 37 532.8, filed on Oct. 20, 1994, is incorporated fully herein by reference. Priority of this German application is claimed.

What is claimed is:

1. An adjustable assembly for connecting a window regulator to a window defining at least one hole, the assembly comprising:

an expandable external insertion part for extending into the hole, the external insertion part having two opposing inward faces defining a slot shaped opening therebetween;

an expandable internal insertion part comprising two opposing outward faces, the outward faces being parallel to the inward faces allowing for the slidable insertion of the internal insertion part into the slot shaped opening wherein the relative positions of the internal insertion part and the external insertion part can be adjusted and fixed when the outward faces are expanded to engage the inner faces;

a mounting plate attached to the external insertion part and having a mounting plate slot; and a cover plate having a flange slidably inserted into the mounting plate slot.

2. The assembly according to claim 1 wherein the internal insertion part comprises a channel adapted to receive a fastener for expanding the internal and external insertion parts for locking them into position relative to the hole.

3. The assembly according to claim 1 wherein a top inward face is smooth to allow adjustment.

4. The assembly according to claim 1 wherein at least one outward face has toothed elements and at least one inward face has toothed elements to engage the toothed elements of the outward face.

5. The assembly according to claim 4 wherein the toothed elements are perpendicular to a direction of adjustment of the internal insertion part and the external insertion part.

6. The assembly according to claim 1 further comprising a fastener and wherein the internal insertion part comprises two regions, and an axial channel, and the fastener is inserted into the channel to expand the internal insertion part.

7. The assembly according to claim 1 further comprising a base plate attached to the internal insertion part and means for preventing torsion between the base plate and the mounting plate.

8. The assembly according to claim 1 wherein the mounting plate attached to the external insertion part has a relief slot associated with the external insertion part to allow the external insertion part to flex radially.

9. The assembly according to claim 1 wherein the cover plate has a plurality of stops associated with a bottom edge of the cover plate.

10. The assembly according to claim 1 wherein the slot shaped opening defined in the external insertion part is oriented horizontally so that the insertion parts are adjusted horizontally.

11. The assembly according to claim 5 wherein the internal insertion part comprises a channel adapted to receive a fastener for expanding the internal and external insertion parts whereby the toothed elements of the inward face engage the toothed elements of the outward face.

12. An adjustable assembly for connecting a window regulator to a window defining at least one hole, the assembly comprising:

an expandable external insertion part for extending into the hole, the expandable external insertion part defining a slot shaped opening;

a mounting plate attached to the external insertion part, the mounting having at least one bent flange at an edge;

an internal insertion part slidably inserted into the slot shaped opening, wherein the positions of the internal insertion part and the external insertion part can be adjusted; and a base plate attached to the internal insertion part, the base plate having an edge to engage the at least one bent flange for preventing torsion between the base plate and the mounting plate.

13. An adjustable assembly for connecting a window regulator to a window defining at least one hole, the assembly comprising:

an expandable external insertion part for extending into the hole, the expandable external insertion part defining a slot shaped opening;

a mounting plate attached to the external insertion part, the mounting plate having at least one protrusion extending therefrom;

an internal insertion part slidably inserted into the slot shaped opening wherein the positions of the internal insertion part and the external insertion part can be adjusted; and a base plate attached to the internal insertion part, the base plate having at least one recess, wherein the at least one protrusion extends into the at least one recess for preventing torsion between the base plate and the mounting plate.

14. An adjustable assembly for connecting a window regulator to a window, defining at least one hole, the assembly comprising:

an expandable external insertion part for extending into the hole, the expandable external insertion part defining a slot shaped opening;

a mounting plate attached to the external insertion part, the mounting plate defining a slot;

an internal insertion part slidably inserted into the slot shaped opening wherein the positions of the internal insertion part and the external insertion part can be adjusted; and a cover plate having a flange slidably inserted into the slot defined in the mounting plate.

15. An adjustable assembly for connecting a window regulator to a window defining at least one hole, the assembly comprising:

an expandable external insertion part for extending into the hole, the expandable external insertion part defining a slot shaped opening and comprising an inward face having toothed elements and a smooth inward face;

an internal insertion part slidably inserted into the slot shaped opening wherein the positions of the internal insertion part and the external insertion part can be adjusted, the internal insertion part comprising a plurality of outward faces having toothed elements wherein at least one of the outward faces having toothed elements engages the inward face having toothed elements, and the smooth inward face allows adjustment of the assembly whereby the assembly can be turned 180° and the mounting inverted for use on either a driver's side of the vehicle or a passenger's side of the vehicle.

16. An adjustable assembly for connecting a window regulator to a window, the window defining at least one hole and having a first side, the assembly comprising:

an external insertion part for extending into the hole of the window from the first side of the window, the external insertion part defining a slot shaped opening; and an internal insertion part for slidable insertion from the window first side into the slot shaped opening, wherein the internal insertion part is expandable for making contact against the external insertion part fixing the relative positions of the two parts.

17. An adjustable assembly as recited in claim 16 wherein the external insertion part defining a slot shaped opening has an expandable member which is expanded by the expandable internal insertion part for making contact against edges of the hole of the window for fixing the internal insertion part against the external insertion part and against the window.

18. An adjustable assembly for connecting a window regulator to a window defining at least one hole, the assembly comprising:

an expandable external insertion part for extending into the hole, the external insertion part having two opposing inward faces defining a slot shaped opening therebetween; and an expandable internal insertion part comprising two opposing outward faces, the outward faces being parallel to the inward faces allowing for the slidable insertion of the internal insertion part into the slot shaped opening wherein the relative positions of the internal insertion part and the external insertion part can be adjusted and fixed when the outward faces are expanded to engage the inner faces wherein at least one outward face has toothed elements and at least one inward face has toothed elements to engage the toothed elements of the outward face wherein the toothed elements are perpendicular to a direction of adjustment of the internal insertion part and the external insertion part and wherein the internal insertion part comprises a channel adapted to receive a fastener for expanding the internal and external insertion parts whereby the toothed elements of the inward face engage the toothed elements of the outward face.

* * * * *